United States Patent
Geng et al.

(10) Patent No.: US 12,469,473 B2
(45) Date of Patent: Nov. 11, 2025

(54) IMAGE QUALITY ADJUSTING METHOD AND ASSEMBLY, DISPLAY SYSTEM AND COMPUTER READABLE MEDIUM

(71) Applicant: BOE TECHNOLOGY GROUP CO., LTD., Beijing (CN)

(72) Inventors: Lihua Geng, Beijing (CN); Xitong Ma, Beijing (CN); Youxiang Xia, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/579,333

(22) PCT Filed: Aug. 23, 2022

(86) PCT No.: PCT/CN2022/114217
§ 371 (c)(1),
(2) Date: Jan. 13, 2024

(87) PCT Pub. No.: WO2023/045671
PCT Pub. Date: Mar. 30, 2023

(65) Prior Publication Data
US 2024/0347021 A1    Oct. 17, 2024

(30) Foreign Application Priority Data
Sep. 26, 2021  (CN) .......................... 202111127230.0

(51) Int. Cl.
G09G 5/02 (2006.01)
G06T 7/00 (2017.01)
(Continued)

(52) U.S. Cl.
CPC .............. G09G 5/02 (2013.01); G06T 7/0002 (2013.01); G06T 7/90 (2017.01); G09G 5/10 (2013.01);
(Continued)

(58) Field of Classification Search
CPC . G06T 2207/10024; G06T 2207/30168; G06T 7/0002; G06T 7/90;
(Continued)

(56) References Cited

U.S. PATENT DOCUMENTS

| | | | | |
|---|---|---|---|---|
| 2020/0074688 A1* | 3/2020 | Kambhatla | | G06T 7/194 |
| 2021/0098541 A1* | 4/2021 | Hei | | G06T 7/143 |
| 2021/0343222 A1* | 11/2021 | Hei | | G09G 3/3233 |

FOREIGN PATENT DOCUMENTS

| | | |
|---|---|---|
| CN | 104867455 A | 8/2015 |
| CN | 105259687 A | 1/2016 |
| CN | 106023942 A | 10/2016 |
| CN | 106251807 A | 12/2016 |
| CN | 106910487 A | 6/2017 |
| CN | 107291413 A | 10/2017 |
| CN | 108877740 A | 11/2018 |
| CN | 109192174 A | 1/2019 |
| CN | 109272971 A | 1/2019 |

(Continued)

OTHER PUBLICATIONS

China Patent Office, First Office Action, Nov. 30, 2023, for corresponding CN application 202111127230.0.

*Primary Examiner* — Chun-Nan Lin
(74) *Attorney, Agent, or Firm* — HOUTTEMAN LAW LLC

(57) ABSTRACT

The present disclosure provides an image quality adjusting method, including: acquiring first image quality information of a display assembly while displaying a preset measurement image; performing analysis and calculation based on the first image quality information and a preset second image quality information to generate adjustment information; determining an adjustment type corresponding to each preset partition according to the adjustment information, and determining at least one adjustment region according to the adjustment type corresponding to each preset partition; and performing image quality adjustment on each adjustment region according to the adjustment information. The present disclosure further provides an image quality adjusting assembly, a display system, and a computer readable medium.

14 Claims, 7 Drawing Sheets

(51) Int. Cl.
*G06T 7/90* (2017.01)
*G09G 5/10* (2006.01)

(52) U.S. Cl.
CPC ............... *G06T 2207/10024* (2013.01); *G06T 2207/30168* (2013.01); *G09G 2320/0233* (2013.01); *G09G 2320/0242* (2013.01); *G09G 2320/0686* (2013.01)

(58) Field of Classification Search
CPC ... G09G 2320/0233; G09G 2320/0242; G09G 2320/0686; G09G 5/02; G09G 5/10; H04N 7/18; H04N 9/646
See application file for complete search history.

(56) References Cited

FOREIGN PATENT DOCUMENTS

| | | |
|---|---|---|
| CN | 110248141 A | 9/2019 |
| CN | 112382242 A | 2/2021 |
| CN | 112947824 A | 6/2021 |
| CN | 112992043 A | 6/2021 |
| CN | 113015017 A | 6/2021 |
| CN | 113140197 A | 7/2021 |
| CN | 113873209 A | 12/2021 |
| JP | 2006157222 A | 6/2006 |
| JP | 2009118306 A | 5/2009 |

\* cited by examiner

S4

Determining the adjustment type of each preset partition according to a numerical value interval where the deviation corresponding to the preset partition is located — S404

Classifying all the preset partitions according to the adjustment type of each preset partition — S302

FIG. 6

IMAGE QUALITY ADJUSTING METHOD AND ASSEMBLY, DISPLAY SYSTEM AND COMPUTER READABLE MEDIUM

CROSS-REFERENCE TO RELATED APPLICATIONS

This is a National Phase Application filed under 35 U.S.C. 371 as a national stage of PCT/CN2022/114217 filed on Aug. 23, 2022, an application claiming priority to Chinese patent application No. 202111127230.0, filed on Sep. 26, 2021, the entire content of each of which is incorporated herein by reference.

TECHNICAL FIELD

The present disclosure relates to the field of display technology, and in particular, to an image quality adjusting method (i.e., a method for adjusting an image quality), an image quality adjusting assembly, a display system, and a computer readable medium.

BACKGROUND

A monitor is mainly used in professional image video processing and display fields, such as video-level and broadcast-level program shooting and production, so the display quality requirement on the monitor is high. An image quality is a quality of an image (or a picture), and image quality adjustment is required for a display device such as a monitor to ensure image quality representation of the display device.

At present, a performance of the image quality adjustment is low, and the display uniformity of the display device after the image quality adjustment is low.

SUMMARY

The present disclosure is to solve at least one of the technical problems in the prior art, and provides an image quality adjusting method, an image quality adjusting assembly, a display system, and a computer readable medium.

To achieve the foregoing objects, in a first aspect, embodiments of the present disclosure provide an image quality adjusting method, including:
  acquiring first image quality information of a display assembly while the display assembly is displaying a preset measurement image, wherein the display assembly includes a plurality of preset partitions, and the first image quality information includes an image quality parameter corresponding to each preset partition;
  performing analysis and calculation based on the first image quality information and a preset second image quality information to generate adjustment information;
  determining an adjustment type corresponding to each preset partition according to the adjustment information, and determining at least one adjustment region according to the adjustment type corresponding to each preset partition; and
  performing image quality adjustment on each adjustment region according to the adjustment information.

In some embodiments, each of the preset partitions corresponds to one image quality processing unit; and
  the performing image quality adjustment on each adjustment region according to the adjustment information includes:
    for each of all adjustment regions, setting at least a part of the image quality processing units corresponding to the adjustment region as a target image quality processing unit, and instructing the target image quality processing unit to perform image quality adjustment on the adjustment region according to the adjustment information.

In some embodiments, the for each of all adjustment regions, setting at least a part of the image quality processing units corresponding to the adjustment region as a target image quality processing unit includes:
  for each of all adjustment regions, setting one of all the image quality processing units corresponding to the adjustment region as the target image quality processing unit.

In some embodiments, the plurality of preset partitions have areas equal to each other and shapes identical with each other.

In some embodiments, the image quality parameter includes at least one of a luminance parameter, a color temperature parameter, or a color gamut parameter.

In some embodiments, a measurement image corresponding to the luminance parameter is a grayscale image, a measurement image corresponding to the color temperature parameter is a white image, and a measurement image corresponding to the color gamut parameter is at least one of a red image, a blue image, or a green image.

In some embodiments, the image quality parameter includes at least two of the luminance parameter, the color temperature parameter, and the color gamut parameter;
  the determining an adjustment type corresponding to each preset partition according to the adjustment information and determining at least one adjustment region according to the adjustment type corresponding to each preset partition includes:
    for each image quality parameter, determining an adjustment type of each preset partition at the image quality parameter according to the adjustment information, and determining at least one adjustment region at the image quality parameter; and
  the performing image quality adjustment on each adjustment region according to the adjustment information includes:
    for each image quality parameter, performing image quality adjustment on each adjustment region at the image quality parameter according to the adjustment information.

In some embodiments, the adjustment information includes a deviation of the image quality parameter corresponding to each preset partition; and
  the determining an adjustment type corresponding to each preset partition according to the adjustment information includes:
    determining the adjustment type of each preset partition according to a numerical value interval where the deviation corresponding to the preset partition is located.

In some embodiments, the determining an adjustment type corresponding to each preset partition according to the adjustment information and determining at least one adjustment region according to the adjustment type corresponding to each preset partition includes:
  classifying all the preset partitions according to the adjustment type of each preset partition, wherein a single preset partition having an adjustment type different from an adjustment type corresponding to another preset partition adjacent to the single preset partition is set as one adjustment region, and adjacent preset partitions with a same adjustment type are set as one adjustment region.

In some embodiments, the image quality adjusting method further includes:

performing a masking process on a part of the display assembly except the adjustment region currently being subjected to image quality adjustment.

In a second aspect, embodiments of the present disclosure further provide an image quality adjusting assembly, which includes:

one or more processors; and
a memory configured to store one or more programs thereon;
wherein when being executed by the one or more processors, the one or more programs cause the one or more processors to implement the image quality adjusting method according to any one of the foregoing embodiments.

In a third aspect, embodiments of the present disclosure further provides a display system, which includes: the image quality adjusting assembly according to any one of the foregoing embodiments; and a display assembly;
wherein the display assembly includes a plurality of preset partitions, each of which corresponds to one image quality processing unit.

In a fourth aspect, embodiments of the present disclosure further provides a computer readable medium, having a computer program stored thereon, wherein the computer program, when being executed by a processing core, causes the processing core to implement actions of the image quality adjusting method according to any one of the foregoing embodiments.

BRIEF DESCRIPTION OF THE DRAWINGS

The accompanying drawings, which are included to provide a further understanding of the present disclosure and constitute a part of this specification, illustrate the present disclosure together with embodiments of the present disclosure, but are not intended to limit the present disclosure. The above and other features and advantages will become more apparent to one of ordinary skill in the art by describing below in detail exemplary embodiments of the present disclosure with reference to the accompanying drawings, in which:

FIG. 5 is a flowchart of another exemplary implementation of step S4 according to an embodiment of the present disclosure;

FIG. 6 is a flowchart of an exemplary implementation of step S3 according to an embodiment of the present disclosure;

DETAILED DESCRIPTION OF EMBODIMENTS

In order to make one of ordinary skill in the art better understand technical solutions of the present disclosure, an image quality adjusting method, an image quality adjusting assembly, a display system, and a computer readable medium provided by the present disclosure will be described in detail below with reference to the accompanying drawings.

Exemplary embodiments will be described more fully hereinafter with reference to the accompanying drawings. However, the exemplary embodiments may be embodied in different forms, and the present disclosure should not be construed as limited to the embodiments set forth herein. Rather, the exemplary embodiments are provided such that this disclosure will be thorough and complete, and will fully convey the scope of the present disclosure to one of ordinary skill in the art.

The terms used herein are for the purpose of describing particular embodiments only and are not intended to limit of the present disclosure. As used herein, the singular forms "a", "an" and "the" are intended to include the plural forms as well, unless the context clearly indicates otherwise. It will be further understood that the terms "comprise" and/or "include", when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used for distinguishing one element from another. Thus, a first element, a first component, or a first assembly discussed below could be termed a second element, a second component, or a second assembly in a case of not departing from the teachings of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
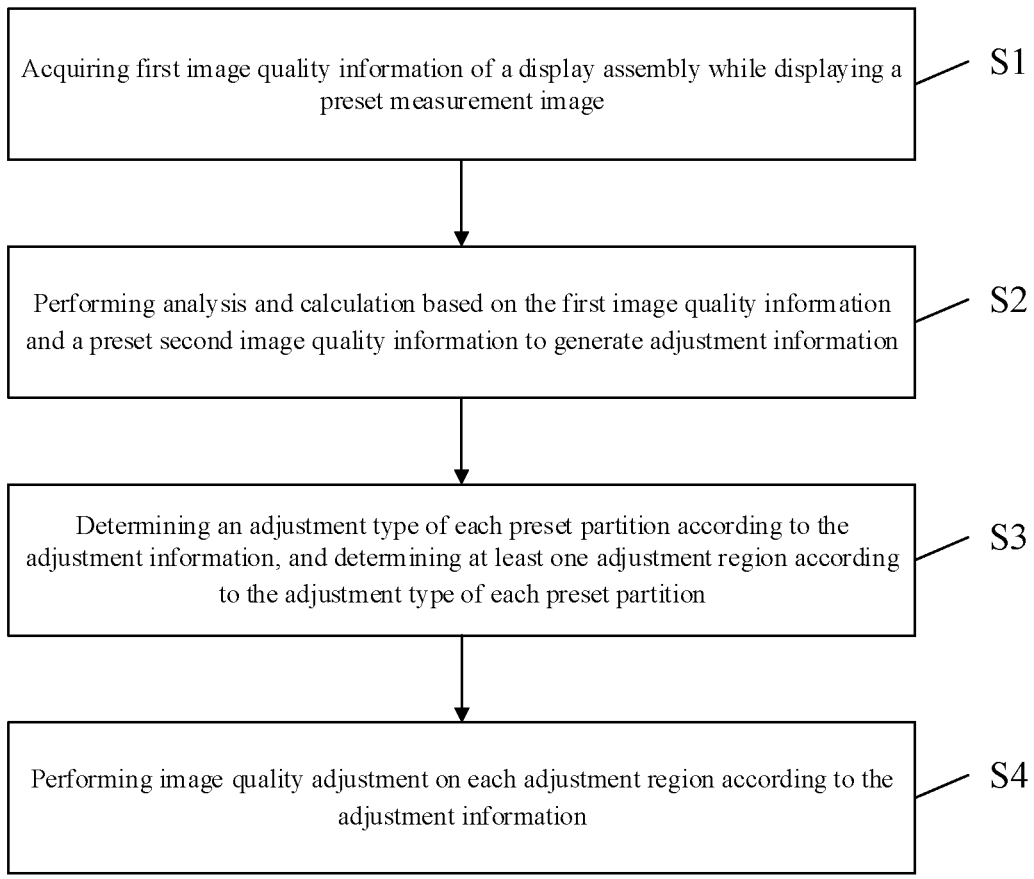
FIG. 1 is a flowchart illustrating an image quality adjusting method according to an embodiment of the present disclosure.

FIG. 1 is a flowchart illustrating an image quality adjusting method according to an embodiment of the present disclosure. As shown in FIG. 1, the image quality adjusting method includes the following steps S1 to S4.

Step S1 includes acquiring first image quality information of a display assembly while displaying a preset measurement image.

The display assembly is divided into a plurality of preset partitions, and the first image quality information includes an image quality parameter corresponding to each of the preset partitions. For example, the display assembly is a display terminal such as a display, a display screen (or a display panel), and a display region of the display assembly is divided into the plurality of preset partitions in advance.

In some embodiments, the first image quality information sent by a system side is received. Alternatively, in some embodiments, the first image quality information is acquired by measuring the display assembly displaying the measurement image in real time.

In some embodiments, the preset partitions have a same area and a same shape (i.e., areas of the preset partitions are equal to each other, and shapes of the preset partitions are identical with each other). In some embodiments, each of the preset partitions is a rectangle.

In some embodiments, the display assembly is divided into the plurality of preset partitions in advance according to a screen size, a display resolution, computational processing resources, and the like of the display assembly. The larger the number of the divided preset partitions is, the finer the image quality adjustment is, the better the uniformity of the image quality of the display assembly is, but more computational processing resources may be consumed. Therefore, in some embodiments, while the division is performed, the display assembly may be divided into enough preset partitions as much as possible on the basis of ensuring that enough computational processing resources are reserved. In some embodiments, each of the preset partitions corresponds to an image quality processing unit. While the division is performed, a first resource consumption amount corresponding to one image quality processing unit may be determined according to a screen size, a display resolution, and a computational capability of the one image quality processing unit, and the number of image quality processing units may be determined according to the first resource consumption amount, a second resource consumption amount of necessary other logic flows (such as timing control, phase lock control, data access, function call, and the like), and a total amount of computational processing resources, so as to determine the number of the preset partitions to be acquired from the division. In some embodiments, to balance the computational processing resources and the image quality adjustment effect, the display assembly may be divided into 25 preset partitions having a same area and a same shape according to a division manner of 5×5.

In some embodiments, image quality parameters include at least one of a luminance parameter, a color temperature parameter, or a color gamut parameter.

In some embodiments, a measurement image corresponding to the luminance parameter is a grayscale image, a measurement image corresponding to the color temperature parameter is a white image, and a measurement image corresponding to the color gamut parameter is at least one of a red image, a blue image, or a green image. In an exemplary case of an 8-bit RGB color space, the measurement image corresponding to the luminance parameter is the grayscale image with corresponding parameters R, G and B set to be R being in a range of 0 to 255, G being in a range of 0 to 255, and B being in a range of 0 to 255, the measurement image corresponding to the color temperature parameter is a white image with the corresponding parameters set to be R=255, G=255, and B=255, and the measurement image corresponding to the color gamut parameter is at least one of the following images: a red image with the corresponding parameters set to be R=255, G=0, and B=0, a green image with the corresponding parameters set to be R=0, G=255, and B=0, or a blue image with the corresponding parameter set to be R=0, G=0, and B=255.

Step S2 includes performing analysis and calculation based on the first image quality information and preset second image quality information to generate adjustment information.

The second image quality information is expected image quality information corresponding to the display assembly and includes reference image quality parameters of the display assembly, and the reference image quality parameters may correspond to delivery (or factory) standard reference values of the display assembly or may be expected reference values corresponding to a current display scene. The performing analysis and calculation based on the first image quality information and a preset second image quality information may include matching and comparing image quality parameters in the first image quality information to (or with) image quality parameters in the second image quality information. The adjustment information may represent a difference between an image quality performance of each of the preset partitions and an expected image quality performance, and may be further used for representing a deviation of the image quality parameter of each of the preset partitions from the expected image quality parameter.

Step S3 includes determining an adjustment type of each preset partition according to the adjustment information, and determining at least one adjustment region according to the adjustment type of each preset partition.

The adjustment type is related to the deviation of the image quality parameters of the preset partition, and the preset partitions with a same adjustment type have the same (i.e., identical) image quality characteristics. In some embodiments, the adjustment type may be determined according to a numerical magnitude relationship between an image quality parameter corresponding to the preset partition and a reference image quality parameter. For example, in a case where the image quality parameter includes a color temperature parameter, where a color temperature value corresponding to the color temperature parameter in the second image quality information is 9,600K, where a color temperature value corresponding to a first preset partition is 9,500K, and where a color temperature value corresponding to a second preset partition is 9,700K, it is determined that an adjustment type corresponding to the first preset partition is a first adjustment type and an adjustment type corresponding to the second preset partition is a second adjustment type.

In some embodiments, the adjustment type is further related to a parameter type of the image quality parameter to be adjusted. Specifically, the image quality parameters may include various types of parameters, such as the luminance parameter, the color temperature parameter, the color gamut parameter, and the like, and the adjustment type may be determined according to the type of the image quality parameter to be adjusted in a single preset partition.

In some embodiments, the adjacent preset partitions with a same adjustment type are taken as one adjustment region. Alternatively, in some embodiments, the preset partitions with a same adjustment type are taken as one adjustment region. Alternatively, in some embodiments, each of the preset partitions is individually taken as one adjustment region.

Step S4 includes adjusting an image quality of each adjustment region according to the adjustment information (i.e., performing image quality adjustment on each adjustment region according to the adjustment information).

In this step, the image quality of each adjustment region is adjusted based on the deviation of an image quality parameter of each adjustment region, such that the accuracy and fineness of the image quality adjustment of the display assembly are ensured and the image quality uniformity of the adjusted display assembly is improved through the regional image quality adjustment.

In some embodiments, for each of all the adjustment regions, while image quality adjustment is performed, an image quality parameter corresponding to the adjustment region is configured and adjusted according to the adjustment information, and third image quality information of the adjusted adjustment region is acquired. Analysis and calculation are performed based on the third image quality information and preset second image quality information to generate new adjustment information. The image quality adjustment of the adjustment region is completed in response to an image quality parameter in the third image quality information matching with an image quality parameter in the second image quality information, and an image quality parameter corresponding to the adjustment region is configured and adjusted according to the new adjustment information, in response to the image quality parameter in the third image quality information not matching with the image quality parameter in the second image quality information.

In some embodiments, a plurality of adjustment regions are subjected to image quality adjustment in parallel. Alternatively, in some embodiments, the plurality of adjustment regions are subjected to image quality adjustment one by one based on a preset sequence, such as a sequence related to the relative positions of the adjustment regions. In some embodiments, the plurality of adjustment regions are subjected to the image quality adjustment sequentially based on the adjustment types corresponding to the adjustment regions.

In the present embodiment, the display region of the display assembly is divided into the plurality of preset partitions, and image quality parameters corresponding to any two of the preset partitions may be different from each other. Specifically, the image quality parameters corresponding to different preset partitions may be different from each other due to interference of some objective factors, such as nonuniform backlight and nonuniform light transmittance of materials, during a manufacturing process of the display assembly.

In the prior art, while the image quality parameters of the display assembly are calibrated and adjusted, the whole display assembly is adjusted, and thus the calibration accuracy and the uniformity of image quality adjustment thereof are low in consideration of a difference in image quality of parts of the display assembly. In the image quality adjusting method according to an embodiment of the present disclosure, by acquiring the first image quality information of the display assembly while the display assembly displays a preset measurement image, comparing the first image quality information with expected second image quality information, determining an adjustment type of each preset partition of the display assembly, determining at least one adjustment region according to the adjustment type, and adjusting each adjustment region, the image quality of different regions is consistent with each other after adjustment, thereby improving consistency of image quality adjustment, and increasing uniformity of image display after the image quality of the display assembly is adjusted.

Figure 2:
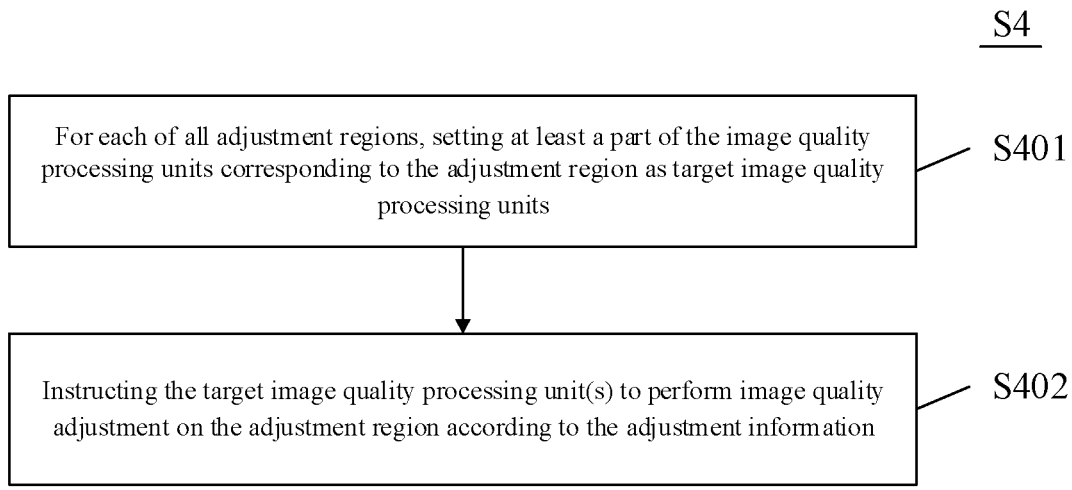
FIG. 2 is a flowchart of an exemplary implementation of step S4 according to an embodiment of the present disclosure.

FIG. 2 is a flowchart of an exemplary implementation of step S4 according to an embodiment of the present disclosure. Specifically, each of the preset partitions corresponds to one image quality processing unit, and as shown in FIG. 2, the step S4 of adjusting an image quality of each adjustment region according to the adjustment information includes the following step S401 and step S402.

Step S401 includes for each of all adjustment regions, setting at least a part of the image quality processing units corresponding to the adjustment region as target image quality processing units.

In some embodiments, in order to reduce the resource consumption and ensure the processing speed of the image quality adjustment, a part of the image quality processing units corresponding to the adjustment region is set as target image quality processing units. Alternatively, in some embodiments, each of the image quality processing units performs image quality adjustment on the preset partition corresponding to the image quality processing unit. Alternatively, all the computational processing resources corresponding to a single adjustment region are combined to perform image quality adjustment, i.e., all the image quality processing units corresponding to the adjustment region are set as the target image quality processing units.

In some embodiments, for each of all adjustment regions, one of all the image quality processing units corresponding to the adjustment region is set as a target image quality processing unit. Specifically, in some embodiments, the preset partitions have an identical area and are rectangles, and are numbered based on natural numbers in a row direction and a column direction, such that two sets of opposite sides of each rectangle are parallel to the row direction and the column direction, respectively. When a target image quality processing unit is to be determined, the image quality processing unit, which has the smallest row number and the smallest column number, in all image quality processing units corresponding to an adjustment region will be set as a target image quality processing unit. In this way, one image quality processing unit is set for each preset partition correspondingly, while image quality adjustment is carried out, image quality adjustment of the adjustment region is carried out by using the one image quality processing unit, and other image quality processing units of the adjustment region do not operate, thereby reducing system resource consumption and power consumption.

In some embodiments, a plurality of image quality processing units corresponding to the plurality of preset partitions may be disposed in an image quality adjusting assembly applying the method.

Step S402 includes instructing the target image quality processing unit(s) to perform image quality adjustment on the adjustment region according to the adjustment information.

In this step, for each of all the adjustment regions, the target image quality processing unit(s) is (are) instructed to perform image quality adjustment on the adjustment region according to the adjustment information.

In some embodiments, if the adjustment types corresponding to at least two adjustment regions are the same, the target image quality processing unit(s) corresponding to one of the at least two adjustment regions is (are) instructed to perform image quality adjustment on the at least two adjustment regions. That is, if the adjustment types corresponding to multiple adjustment regions are the same, the same one or more target image quality processing units are instructed to perform image quality adjustment on the multiple adjustment regions. Specifically, if each preset partition is individually set as an adjustment region, for multiple preset partitions with the same adjustment type, the image quality processing unit(s) corresponding to any one of the multiple preset partitions is (are) instructed to perform image quality adjustment on the multiple preset partitions. If adjacent preset partitions with the same adjustment type are set as an adjustment region, for multiple adjustment regions with the same adjustment type but not adjacent to each other, the target image quality processing unit(s) corresponding to any one of the multiple adjustment regions is (are) instructed to perform image quality adjustment on the multiple adjustment regions.

In some embodiments, instructions are sent to the target image quality processing units of multiple adjustment regions simultaneously to perform image quality adjustment in parallel. Alternatively, in some embodiments, instructions are sent to the target image quality processing units of multiple adjustment regions based on a preset sequence to perform image quality adjustment on the multiple adjustment regions in sequence. In some embodiments, instructions are sent to the target image quality processing units of the adjustment regions based on the adjustment types corresponding to the adjustment regions, to perform image quality adjustment on the adjustment regions sequentially based on the adjustment types corresponding to the adjustment regions.

In this way, different image quality processing units are used for carrying out image quality adjustment on different adjustment regions, and different adjustment regions have different image quality characteristics, thereby improving the accuracy and the efficiency of image quality adjustment.

Figures 3, 4:
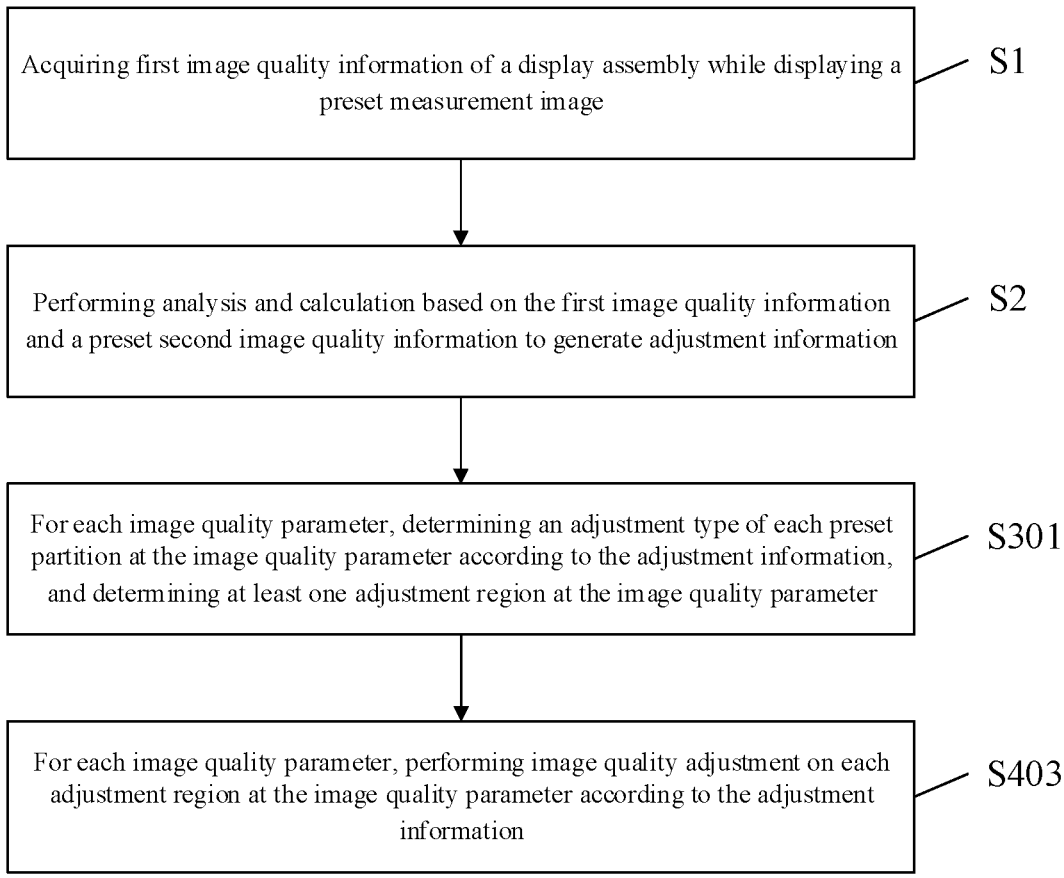
FIG. 3 is a flowchart of an exemplary implementation of step S1 according to an embodiment of the present disclosure.
FIG. 4 is a flowchart illustrating another image quality adjusting method according to an embodiment of the present disclosure.

FIG. 3 is a flowchart illustrating an exemplary implementation of step S1 according to an embodiment of the present disclosure. As shown in FIG. 3, step S1 of acquiring first image quality information of a display assembly while displaying a preset measurement image includes the following step S101.

Step S101 includes for each of all preset partitions, measuring a symmetric center of the preset partition to acquire a measurement result, and acquiring an image quality parameter of the preset partition based on the measurement result.

In some embodiments, the symmetric center of each preset partition is measured to acquire the image quality parameter of the preset partition, and in some embodiments, is measured in real time by using an optical measuring device (e.g., a CCD camera).

FIG. 4 is a flowchart of another image quality adjusting method according to an embodiment of the present disclosure. In particular, this method is an exemplary alternative embodiment based on the method shown in FIG. 1. The image quality parameters include at least two of the luminance parameter, the color temperature parameter, and the color gamut parameter. As shown in FIG. 4, this method includes not only steps S1 and S2, but also steps S301 and S403, where step S301 is an alternative embodiment of step S3, and step S403 is an alternative embodiment of step S4. Only steps S301 and S403 will be described in detail below.

Step S3 of determining an adjustment type of each preset partition according to the adjustment information and determining at least one adjustment region according to the adjustment type of each preset partition includes step 301.

Step 301 includes for each image quality parameter, determining an adjustment type of each preset partition at the image quality parameter according to the adjustment information, and determining at least one adjustment region at the image quality parameter.

Step S4 of adjusting an image quality of each adjustment region according to the adjustment information (i.e., performing image quality adjustment on each adjustment region according to the adjustment information) includes step S403.

Step S403 includes for each image quality parameter, performing image quality adjustment on each adjustment region at the image quality parameter according to the adjustment information.

In this step, each image quality parameter of the display assembly is adjusted individually. In some embodiments, the image quality parameters include the luminance parameter, the color temperature parameter, and the color gamut parameter, and while image quality adjustment is performed, the image quality adjustment is performed on the display assembly according to the sequence of adjusting the luminance, adjusting the color temperature, and adjusting the color gamut.

FIG. 5 is a flowchart of another exemplary implementation of step S4 according to an embodiment of the present disclosure. Specifically, the adjustment information includes a deviation of an image quality parameter corresponding to each preset partition. As shown in FIG. 5, the step S4 of adjusting an image quality of each adjustment region according to the adjustment information (i.e., performing image quality adjustment on each adjustment region according to the adjustment information) includes the following step S404.

Step S404 includes determining the adjustment type of each preset partition according to a numerical value interval where the deviation corresponding to the preset partition is located.

The deviation may be a difference between an image quality parameter in the first image quality information and an image quality parameter in the second image quality information, or a ratio acquired based on the difference, which may represent a deviation of the image quality of the preset partition. A plurality of numerical value intervals are set in advance, each of which corresponds to one adjustment type. For example, in a case where the deviation as a ratio, for each preset partition, analysis and calculation are performed based on an image quality parameter $P$ in the first image quality information and an image quality parameter $P_1$ in the second image quality information, so as to acquire a deviation y, where $y=(P-P_1)/P_1$. The plurality of numerical value intervals set in advance include a first interval of $[-3x, -2x)$ corresponding to a first type, a second interval of $[-2x, -x)$ corresponding to a second type, a third interval of $[-x,0)$ corresponding to a third type, a fourth interval of $(0, x)$ corresponding to a fourth type, a fifth interval of $[x,2x)$ corresponding to a fifth type, and a sixth interval of $[2x,3x]$ corresponding to a sixth type. According to a numerical value interval where the deviation y is located, the corresponding adjustment type of a preset partition can be determined. In some embodiments, the image quality parameter includes at least one of the luminance parameter, the color temperature parameter, or the color gamut parameter, x may be 5 for the luminance parameter, x may be 2 for the color temperature parameter, and x may be 0.2 for the color gamut parameter.

FIG. 6 is a flowchart illustrating an exemplary implementation of step S3 according to an embodiment of the present disclosure. As shown in FIG. 6, step S3 of determining an adjustment type of each preset partition according to the adjustment information and determining at least one adjustment region according to the adjustment type of each preset partition includes the following step S302.

Step S302 includes classifying all the preset partitions according to the adjustment type of each preset partition.

In this step, a single preset partition having an adjustment type different from an adjustment type corresponding to another adjacent preset partition is set as one adjustment region, and adjacent preset partitions with a same adjustment type are set as one adjustment region. Specifically, the preset partitions with a same adjustment type have the same (i.e., identical) image quality characteristics, and may be subjected to image quality adjustment collectively.

Figure 7:
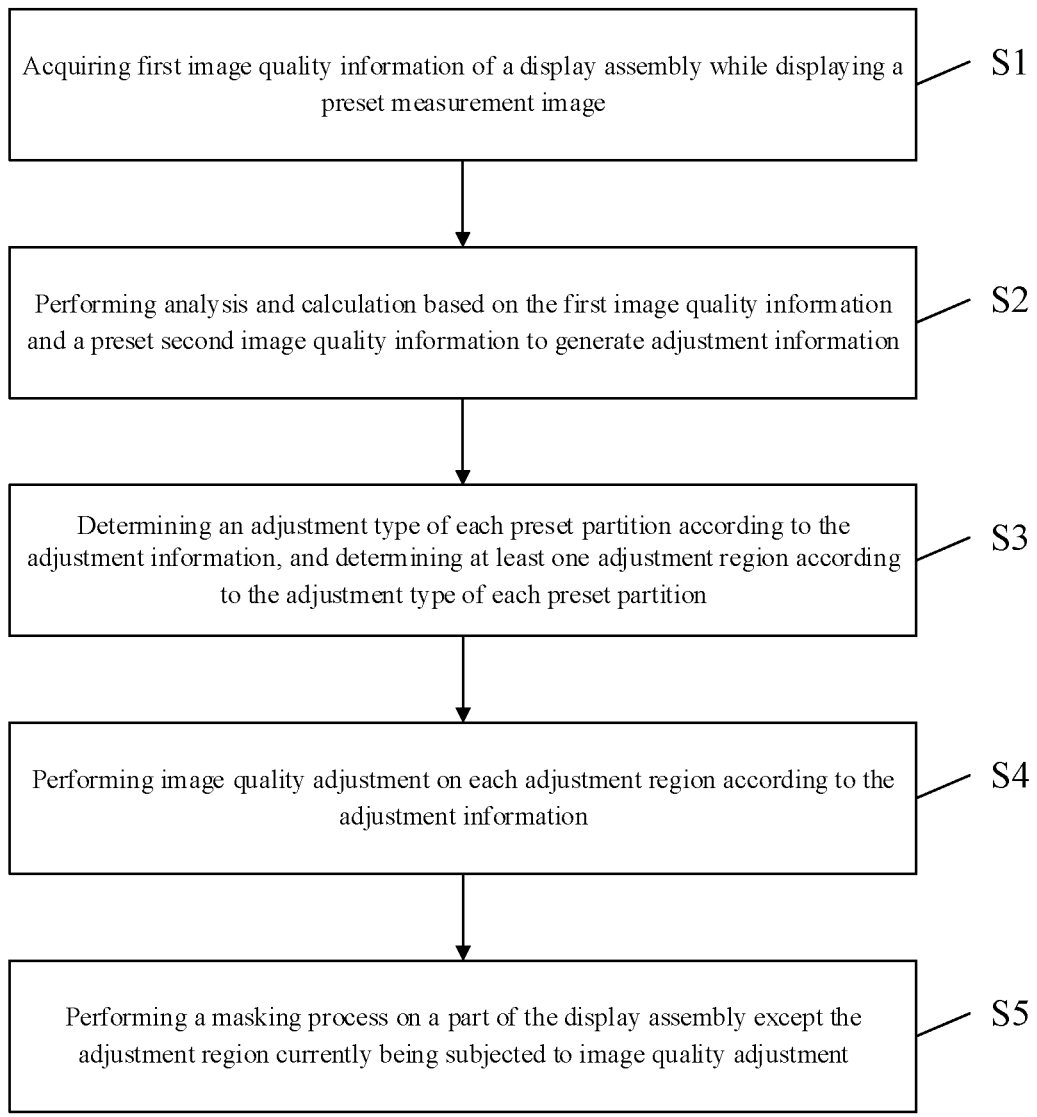
FIG. 7 is a flowchart illustrating another image quality adjusting method according to an embodiment of the present disclosure.

FIG. 7 is a flowchart of another image quality adjusting method according to an embodiment of the present disclosure. In particular, this method is an exemplary alternative embodiment based on the method shown in FIG. 1. As shown in FIG. 7, this method includes not only steps S1 through S4 but also step S5. Only step S5 will be described in detail below.

Step S5 includes performing a masking process on a part of the display assembly except the adjustment region currently being subjected to image quality adjustment.

In order to improve the perceptibility of the image quality adjustment, a masking process is performed on regions except the adjustment region on which the image quality adjustment is currently performed.

In some embodiments, image quality adjustments to be performed on the adjustment regions are sequentially performed, and in this case, a masking process is performed on the adjustment regions having been subjected to image quality adjustment and the adjustment regions waiting for (i.e., to be subjected to) image quality adjustment. In this way, a user can perceive and pay attention to the adjustment region currently being subjected to image quality adjustment by the user's eyes.

The image quality adjusting method provided by an embodiment of the present disclosure will be further described in detail below with reference to practical applications.

Figure 8:
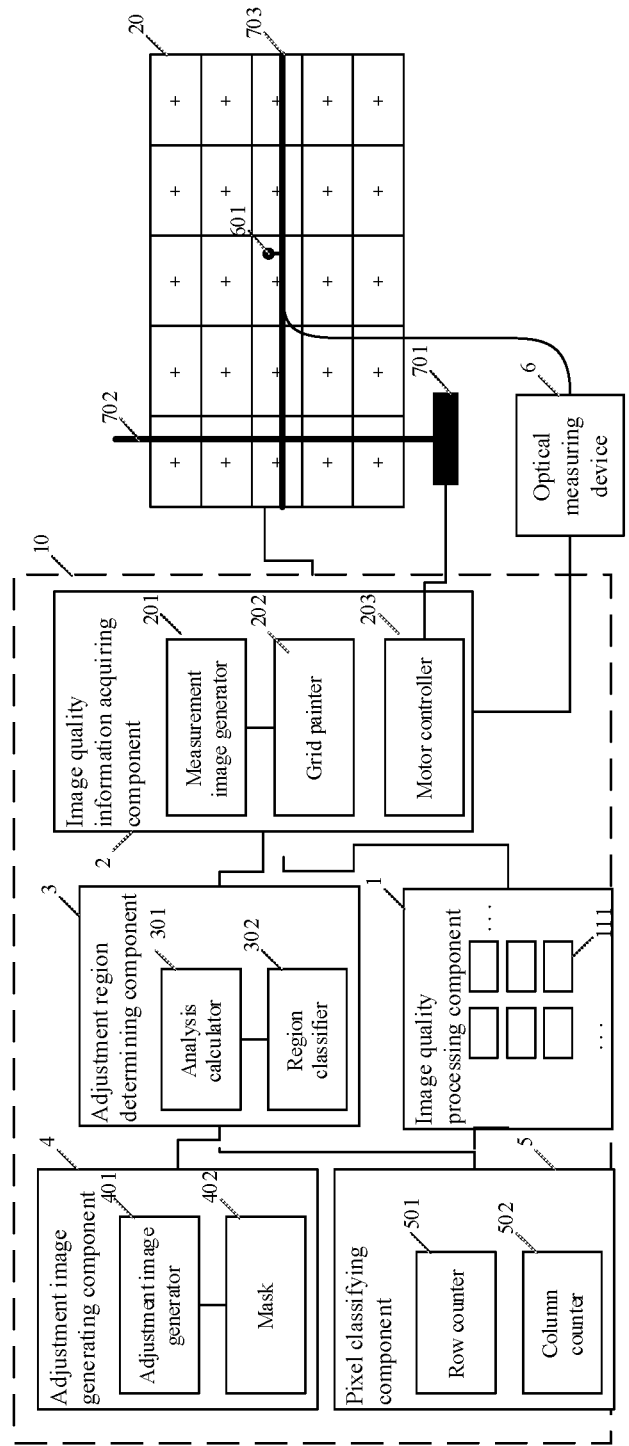
FIG. 8 is a schematic diagram illustrating a structure of a display system according to an embodiment of the present disclosure.

FIG. 8 is a schematic diagram illustrating a structure of a display system according to an embodiment of the present disclosure. Specifically, under the scenes of factory test, display system autonomous test, manual adjustment mode by a user, and the like, the display system enters an adjustment mode to adjust an image quality of the display assembly. As shown in FIG. 8, the display system includes: an image quality adjusting assembly 10 and a display assembly 20.

The display assembly 20 is divided into the plurality of preset partitions, each of which corresponds to one of image quality processing units 111, and the image quality processing units 111 are disposed in an image quality processing component 1 of the image quality adjusting assembly 10.

The image quality adjusting assembly 10 includes the image quality processing component 1, an image quality information acquiring component 2, and an adjustment region determining component 3.

The image quality information acquiring component 2 is configured to acquire the first image quality information of the display assembly 20 while the display assembly 20 is displaying a preset measurement image, and the first image quality information includes image quality parameters corresponding to each preset partition of the display assembly 20. The image quality parameters include the luminance parameter, the color temperature parameter, and the color gamut parameter.

In some embodiments, as shown in FIG. 8, the image quality information acquiring component 2 includes a measurement image generator 201 configured to generate measurement images corresponding to the image quality parameters and transmit the measurement images to the display assembly 20. For example, the measurement images include a grayscale image corresponding to the luminance parameter, a white image corresponding to the color temperature parameter, red, blue, and green images corresponding to the color gamut parameter, and the like. In some embodiments, as shown in FIG. 8, the image quality information acquiring component 2 further includes a grid painter 202 configured to paint (or draw) a grid on the measurement image, and each lattice (i.e., aperture or hole) of the grid corresponds to one of the preset partitions, so as to visually identify the preset partitions of the display assembly 20.

In some embodiments, as shown in FIG. 8, the image quality information acquiring component 2 includes a motor controller 203, and the display system further includes an optical measuring assembly. The optical measuring assembly includes an optical measuring device 6 and a support 7. The optical measuring device 6 includes a measuring probe 601, and the support 7 includes a pedestal 701, a horizontal rod 702, a vertical rod 703, and a motor (which is not shown in the figure). The vertical rod 703 is arranged on the pedestal 701, the horizontal rod 702 and the vertical rod 703 are arranged to cross each other, a length of the horizontal rod 702 and a length of the vertical rod 703 are both adjustable. The measuring probe 601 is arranged on the horizontal rod 702. The motor is configured to drive the horizontal rod 702 to move in a column direction along the vertical rod 703 and drive the measuring probe 601 to move in a row direction along the horizontal rod 702, according to a control signal sent from the motor controller 203, such that automatic measurement is performed on the preset partitions. The optical measuring device 6 combines the image quality parameters of the preset partitions measured by the measuring probe 601, and sends the first image quality information of the display assembly 20 to the image quality information acquiring component 2.

Figures 9, 10:
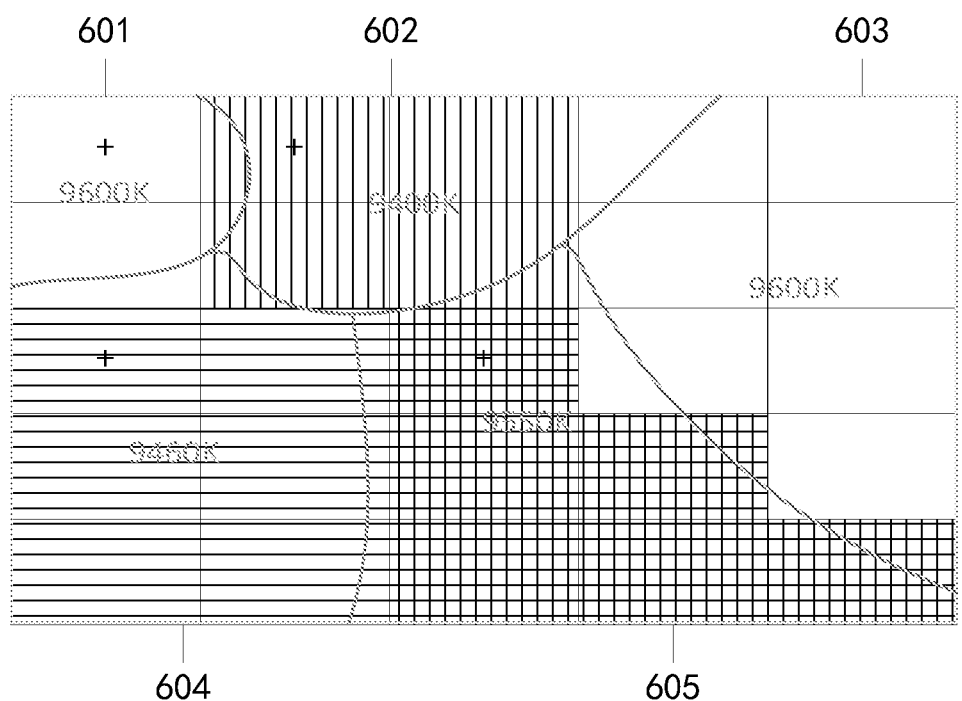
FIG. 9 is a schematic diagram illustrating preset partitions according to an embodiment of the present disclosure.
FIG. 10 is a schematic diagram illustrating adjustment regions according to an embodiment of the present disclosure.

FIG. 9 is a schematic diagram illustrating the preset partitions according to an embodiment of the present disclosure. As shown in FIG. 9, exemplarily, the display assembly is divided according to a division manner of 5×5, and the preset partitions have a same (i.e., identical) area and are all rectangles. Positions of the preset partitions may be intuitively perceived based on a drawing result of the grid painter 202. A cross identification position of each preset partition is a measurement position corresponding to the preset partition, i.e., a center of the rectangle, and the measurement position can be positioned more clearly based on the drawing result of the grid painter 202.

The adjustment region determining component 3 includes an analysis calculator 301 and a region classifier 302. The analysis calculator 301 is configured to perform analysis and calculation based on the first image quality information transmitted from the image quality information acquiring component 2 and preset second image quality information to generate the adjustment information, and send the adjustment information to the region classifier 302, where the adjustment information includes a deviation of an image quality parameter corresponding to each preset partition. The region classifier 302 is configured to determine an adjustment type corresponding to each preset partition according to a numerical value interval where the deviation corresponding to the preset partition is located, and classify all the preset partitions according to the adjustment type corresponding to each preset partition, so as to set a single preset partition having an adjustment type different from an adjustment type corresponding to another adjacent preset partitions as one adjustment region, and set adjacent preset partitions with a same adjustment type as one adjustment region.

The image quality processing component 1 includes a plurality of image quality processing units 111, each of which corresponds to one of the preset partitions. Each adjustment region may cover multiple preset partitions. While image quality adjustment is performed, for each of all the adjustment regions, one of all the image quality processing units 111 corresponding to the adjustment region is set as a target image quality processing unit, the target image quality processing unit is instructed to perform image quality adjustment on the adjustment region according to the adjustment information; and if the adjustment types corresponding to at least two adjustment regions are identical with each other, the target image quality processing unit corresponding to one of the at least two adjustment regions is instructed to perform image quality adjustment on the at least two adjustment regions. As such, while the image quality is adjusted, not all the image quality processing units 111 are invoked, but one of the image quality processing units 111 is selected to process the preset partitions with a same adjustment type and identical image quality characteristics, such that the fineness of the image quality adjustment is improved while processing resources are saved.

FIG. 10 is a schematic diagram illustrating the adjustment regions according to an embodiment of the present disclosure. Specifically, an image quality adjustment process for the color temperature parameter is taken as an example. As shown in FIG. 10, the parts divided by the curves correspond to parts of the display assembly 20 actually having differences in color temperature. A color temperature of each of a first part 601 and a third part 603 is 9,600K, a color temperature of a second part 602 is 9,400K, a color temperature of a fourth part 604 is 9,460K, and a color temperature of a fifth part 605 is 9,550K. The image quality information acquiring component 2 acquires the first image quality information measured by the optical measuring assembly, which carries a measured color temperature parameter. The analysis calculator 301 performs analysis and calculation based on the color temperature parameter and an expected color temperature parameter in the second image quality information to generate adjustment information that includes a deviation of the color temperature parameter of each preset partition, and a color temperature corresponding to the expected color temperature parameter in the second image quality information is 9,600K. The region classifier 302 determines an adjustment type of each preset partition according to the relationship between the deviation of the preset partition and preset numerical value intervals. As shown in FIG. 10 showing the determined adjustment regions, which are distinguished from each other by different filling shapes in the figure, each of the determined adjustment regions includes multiple preset partitions, and the determined adjustment regions approximately overlap with the parts that are divided by the curves and actually have differences in color temperature. The image quality processing unit 111 corresponding to the preset partition located at a relative upper left position in each adjustment region is set as a target image quality processing unit, and the measurement position corresponding to each selected preset partition is identified by a cross mark in the figures. While image quality is adjusted, the measurement position is measured, and the image quality information of the whole adjustment region after the adjustment is determined based on the measurement result.

In some embodiments, as shown in FIG. 8, the image quality adjusting assembly 10 further includes an adjustment image generating component 4 and a pixel classifying component 5. The adjustment image generating component 4 includes an adjustment image generator 401 and a mask 402. The adjustment image generator 401 is configured to generate an adjustment image for performing image quality adjustment for each image quality parameter, and in some embodiments, one of the adjustment image generator 401 and the measurement image generator 201 may serve as the other thereof. The mask 402 is configured to perform a masking process on a part of the display assembly except the adjustment region currently being subjected to image quality adjustment, so as to increase intuitiveness and perceptibility of the image quality adjustment, where the masking process is performed based on a black image.

Figure 11:
FIG. 11 is a schematic diagram illustrating the adjustment regions shown in FIG. 10 after being subjected to a masking process.

FIG. 11 is a schematic diagram illustrating the adjustment regions shown in FIG. 10 after being subjected to a masking process. As shown in FIG. 11 showing the case after the masking process is performed while the adjustment regions corresponding to the first part 601 and the third part 603 shown in FIG. 10 are being subjected to image quality adjustment, the masking process is performed on the basis of the black image for other adjustment regions except the adjustment regions corresponding to the first part 601 and the third part 603.

The pixel classifying component 5 includes a row counter 501 and a column counter 502, which are configured to count rows and columns of pixels, respectively. Since each target image quality processing unit corresponds to only one preset partition, the pixel classifying component 5 determines an adjustment region to which a specific pixel belongs according to the classifying result of the region classifier 302, so as to control the target image quality processing unit to acquire the corresponding whole adjustment region, and perform image quality adjustment on the adjustment region.

In some embodiments, each image quality processing unit 111 includes a luminance adjuster, a color temperature adjuster, and a color gamut adjuster. The luminance adjuster may change a relationship between an input grayscale and an output pixel grayscale by changing parameter values in a luminance (i.e., brightness) display look-up table (e.g., Gamma LUT). In a specific adjusting process, the adjustment image generator 401 sequentially generates images with grayscales of 0 to 255. The image quality information acquiring component 2 acquires the luminance parameter of an image of the display assembly 20 measured by the optical measuring assembly at each grayscale, and feeds the luminance parameter to the luminance adjuster. The luminance adjuster compares the luminance parameter of the adjustment image at the grayscale with the luminance parameter in the expected second image quality information; and if the luminance parameters are different from each other, the luminance adjuster changes the value in the luminance display look-up table corresponding to the grayscale according to a deviation, and then the above steps are executed (or repeated) until the adjusted luminance (i.e., brightness) is equal to the expected luminance; and then the adjustment of the next grayscale is carried out. The operation principle of the color temperature adjuster is similar to that of the luminance adjuster, and an adjustment process of the color gamut adjuster is similar to that of the color temperature adjuster. Taking the color temperature adjuster adjusting a white image with a grayscale of 255 as an example, the image quality information acquiring component 2 acquires the color temperature parameter, which is measured by the optical measuring assembly, of the white image displayed by the display assembly 20, and feeds the color temperature parameter to the color temperature adjuster; the color temperature adjuster compares the color temperature parameter with the color temperature parameter in the expected second image quality information; and if the color temperature parameters are different from each other, the color temperature adjuster changes a proportion of RGB while a pixel displays; and then the above steps are executed (or repeated) until an adjusted color temperature of the display assembly 20 is equal to an expected color temperature.

Figure 12:
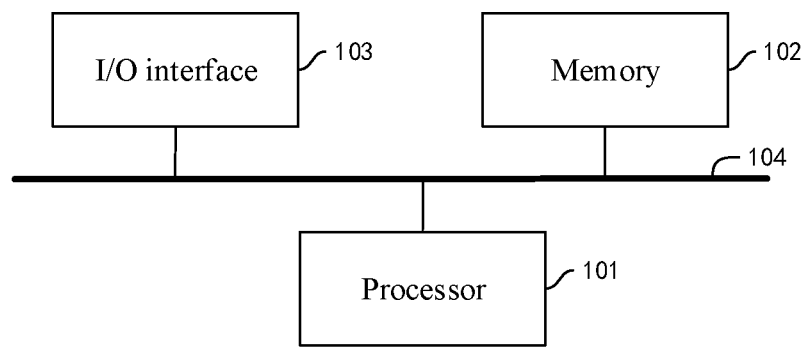
FIG. 12 is a schematic diagram illustrating a structure of an image quality adjusting assembly according to an embodiment of the present disclosure.

FIG. 12 is a schematic diagram illustrating a structure of an image quality adjusting assembly according to an embodiment of the present disclosure. As shown in FIG. 12, the image quality adjusting assembly includes:
one or more processors 101;
a memory 102, having one or more programs stored thereon; when being executed by the one or more processors, the one or more programs cause the one or more processors to implement the image quality adjusting method according to any one of the above embodiments; and
one or more I/O interfaces 103 connected between the one or more processors and the memory, and configured to realize information interaction between the one or more processors and the memory.

Each processor 101 is a device with data processing capability, and includes, but is not limited to, a Central Processing Unit (CPU), etc. . . . The memory 102 is a device with data storage capability, and includes, but is not limited to, a Random Access Memory (RAM, more specifically SDRAM, DDR, etc.), a Read Only Memory (ROM), an Electrically Erasable Programmable Read Only Memory (EEPROM), and/or a FLASH memory (FLASH). Each I/O interface (e.g., read/write interface) 103 is connected between each processor 101 and the memory 102, realizes information interaction between each processor 101 and the memory 102, and includes, but is not limited to, a data bus (Bus) and/or the like.

In some embodiments, each processor 101, the memory 102, and each I/O interface 103 are interconnected via a bus 104, thereby being connected with other components of a computing device.

An embodiment of the present disclosure also provides a display system, which includes an image quality adjusting assembly and a display assembly, where the image quality adjusting assembly is the image quality adjusting assembly according to any one of the above embodiments, the display assembly is divided into a plurality of preset partitions, and each of the preset partitions corresponds to one image quality processing unit.

In some embodiments, the plurality of image quality processing units corresponding to the plurality of preset partitions are disposed in the image quality adjusting assembly, or the plurality of image quality processing units are disposed in the display assembly, or the plurality of image quality processing units may be independently disposed (i.e., disposed outside both the image quality adjusting assembly and the display assembly).

Figure 13:
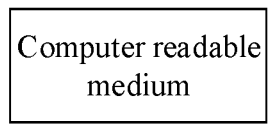
FIG. 13 is a schematic diagram illustrating a structure of a computer readable medium according to an embodiment of the present disclosure.

FIG. 13 is a schematic diagram illustrating a structure of a computer readable medium according to an embodiment of the present disclosure. The computer readable medium stores a computer program thereon, and when executed by a processor, the program implements the image quality adjusting method according to any one of the above embodiments.

It will be understood by one of ordinary skill in the art that all or some of the steps of the methods, and functional components/units of a device as disclosed above may be implemented as software, firmware, hardware, and suitable combinations thereof. In a hardware implementation, the division between functional components/units mentioned in the above description does not necessarily correspond to the division of physical components; for example, one physical component may have multiple functions, or one function or step may be performed by several physical components in cooperation. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on a computer readable medium, which may include a computer storage medium (or non-transitory medium) and a communication medium (or transitory medium). The term of computer storage medium includes transitory and non-transitory, removable and non-removable media implemented in any method or technology for storing information (such as computer readable instructions, data structures, program blocks or other data), as is well known to one of ordinary skill in the art. Computer storage medium includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used for storing the desired information and which can accessed by a computer. In addition, a communication medium typically includes computer readable instructions, data structures, program blocks or other data in a modulated data signal such as a carrier wave or other transport mechanism, and includes any information delivery medium, as is well known to one of ordinary skill in the art.

Exemplary embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by one of ordinary skill in the art that various changes in form and details may be made therein without departing from the scope of the present disclosure as set forth in the appended claims.

What is claimed is:

1. An image quality adjusting method, comprising:
acquiring first image quality information of a display assembly while the display assembly is displaying a preset measurement image, wherein the display assembly comprises a plurality of preset partitions, and the first image quality information comprises an image quality parameter corresponding to each preset partition, wherein the image quality parameter comprises at least one of a luminance parameter, a color temperature parameter, or a color gamut parameter;

performing analysis and calculation based on the first image quality information and a preset second image quality information to generate adjustment information;

determining an adjustment type corresponding to each preset partition according to the adjustment information, and determining at least one adjustment region according to the adjustment type corresponding to each preset partition; and performing image quality adjustment on each adjustment region according to the adjustment information to improve an image quality uniformity of the display assembly.

2. The image quality adjusting method according to claim 1, wherein each of the preset partitions corresponds to one image quality processing unit; and the performing image quality adjustment on each adjustment region according to the adjustment information comprises:

for each adjustment region, setting at least a part of the image quality processing units corresponding to the adjustment region as a target image quality processing unit, and instructing the target image quality processing unit to perform image quality adjustment on the adjustment region according to the adjustment information.

3. The image quality adjusting method according to claim 2, wherein the setting at least a part of the image quality processing units corresponding to the adjustment region as a target image quality processing unit comprises:

setting one of all the image quality processing units corresponding to the adjustment region as the target image quality processing unit.

4. The image quality adjusting method according to claim 3, wherein the plurality of preset partitions have areas equal to each other and shapes identical with each other.

5. The image quality adjusting method according to claim 2, wherein the plurality of preset partitions have areas equal to each other and shapes identical with each other.

6. The image quality adjusting method according to claim 1, wherein the plurality of preset partitions have areas equal to each other and shapes identical with each other.

7. The image quality adjusting method according to claim 1, wherein the adjustment information comprises a deviation of the image quality parameter corresponding to each preset partition; and the determining an adjustment type corresponding to each preset partition according to the adjustment information comprises:

determining the adjustment type of each preset partition according to a numerical value interval where the deviation corresponding to the preset partition is located.

8. The image quality adjusting method according to claim 1, wherein the determining an adjustment type corresponding to each preset partition according to the adjustment information and determining at least one adjustment region according to the adjustment type corresponding to each preset partition comprises:

classifying all the preset partitions according to the adjustment type of each preset partition, wherein a single preset partition having an adjustment type different from an adjustment type corresponding to another preset partition adjacent to the single preset partition is set as one adjustment region, and adjacent preset partitions with a same adjustment type are set as one adjustment region.

9. The image quality adjusting method according to claim 1, further comprising:

performing a masking process on a part of the display assembly except the adjustment region currently being subjected to image quality adjustment.

10. An image quality adjusting assembly, comprising:
one or more processors; and
a memory configured to store one or more programs thereon;

wherein when being executed by the one or more processors, the one or more programs cause the one or more processors to implement the image quality adjusting method according to claim 1.

11. A display system, comprising:
the image quality adjusting assembly according to claim 10; and
a display assembly;

wherein the display assembly comprises a plurality of preset partitions, each of which corresponds to one image quality processing unit.

12. A non-transitory computer readable medium, having a computer program stored thereon, wherein the computer program, when being executed by a processing core, causes the processing core to implement actions of the image quality adjusting method according to claim 1.

13. An image quality adjusting method, comprising:
acquiring first image quality information of a display assembly while the display assembly is displaying a preset measurement image, wherein the display assembly comprises a plurality of preset partitions, and the first image quality information comprises an image quality parameter corresponding to each preset partition, wherein the image quality parameter comprises all of the luminance parameter, the color temperature parameter, and the color gamut parameter;

performing analysis and calculation based on the first image quality information and a preset second image quality information to generate adjustment information;

determining an adjustment type corresponding to each preset partition according to the adjustment information, and determining at least one adjustment region according to the adjustment type corresponding to each preset partition; and performing image quality adjustment on each adjustment region according to the adjustment information to improve an image quality uniformity of the display assembly, a measurement image corresponding to the luminance parameter is a grayscale image, a measurement image corresponding to the color temperature parameter is a white image, and a measurement image corresponding to the color gamut parameter is at least one of a red image, a blue image, or a green image.

14. An image quality adjusting method, comprising:
acquiring first image quality information of a display assembly while the display assembly is displaying a preset measurement image, wherein the display assembly comprises a plurality of preset partitions, and the first image quality information comprises an image quality parameter corresponding to each preset partition, wherein the image quality parameter comprises at least two of the luminance parameter, the color temperature parameter, and the color gamut parameter;

performing analysis and calculation based on the first image quality information and a preset second image quality information to generate adjustment information;

determining an adjustment type corresponding to each preset partition according to the adjustment information, and determining at least one adjustment region according to the adjustment type corresponding to each preset partition; and performing image quality adjustment on each adjustment region according to the adjustment information to improve an image quality uniformity of the display assembly, the determining an adjustment type corresponding to each preset partition according to the adjustment information and determining at least one adjustment region according to the adjustment type corresponding to each preset partition comprises:

for each image quality parameter, determining an adjustment type of each preset partition at the image quality parameter according to the adjustment information, and determining at least one adjustment region at the image quality parameter; and the performing image quality adjustment on each adjustment region according to the adjustment information comprises:

for each image quality parameter, performing image quality adjustment on each adjustment region at the image quality parameter according to the adjustment information.

* * * * *